(12) United States Patent  (10) Patent No.: US 7,962,478 B2
Garbow et al.  (45) Date of Patent: Jun. 14, 2011

(54) MOVEMENT-BASED DYNAMIC FILTERING OF SEARCH RESULTS IN A GRAPHICAL USER INTERFACE

(75) Inventors: Zachary A. Garbow, Rochester, MN (US); Gregory R. Hintermeister, Rochester, MN (US); Candace T. Pederson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/057,832

(22) Filed: Mar. 28, 2008

(65) Prior Publication Data

US 2008/0177714 A1 Jul. 24, 2008

Related U.S. Application Data

(63) Continuation of application No. 11/297,304, filed on Dec. 8, 2005.

(51) Int. Cl.
*G06F 17/30* (2006.01)
(52) U.S. Cl. ...................................... 707/722
(58) Field of Classification Search .................. 707/3, 5, 707/722; 709/203
See application file for complete search history.

(56) References Cited

U.S. PATENT DOCUMENTS

| | | | |
|---|---|---|---|
| 5,666,528 A | 9/1997 | Thai | |
| 5,990,862 A | 11/1999 | Lewis | |
| 6,600,501 B1* | 7/2003 | Israel et al. | 715/810 |
| 2001/0035876 A1 | 11/2001 | Crain et al. | |
| 2001/0044758 A1* | 11/2001 | Talib et al. | 705/27 |
| 2002/0111994 A1* | 8/2002 | Raghunandan | 709/203 |
| 2003/0197744 A1 | 10/2003 | Irvine | |
| 2004/0066418 A1 | 4/2004 | Tosey | |
| 2004/0103090 A1 | 5/2004 | Dogl et al. | |
| 2005/0171940 A1 | 8/2005 | Fogg et al. | |
| 2006/0010401 A1 | 1/2006 | Davidovich et al. | |
| 2006/0069618 A1 | 3/2006 | Milener et al. | |
| 2006/0143568 A1 | 6/2006 | Milener et al. | |
| 2007/0132727 A1* | 6/2007 | Garbow et al. | 345/157 |
| 2008/0177735 A1* | 7/2008 | Garbow et al. | 707/5 |

* cited by examiner

*Primary Examiner* — Etienne P LeRoux
(74) *Attorney, Agent, or Firm* — Martin & Associates, LLC; Derek P. Martin

(57) ABSTRACT

A movement-based filtering mechanism in a graphical user interface allows a user to filter search results by simply moving a pointer, such as a mouse. One or more attributes are displayed to the user in a graphical format. By selecting the pointer (such as clicking on a mouse button), the user may dynamically filter the search results according to the attribute(s) under the pointer. Weighting of multiple attributes may be performed according to the time the pointer spends in each attribute area in the display, or according to a path length of the pointer in each attribute area in the display. In addition, the speed of the dynamic filtering may be directly controlled according to the speed of the movement of the pointer. A timeline may also be displayed that allows the user to go back to any suitable point in time in the filtering process.

18 Claims, 11 Drawing Sheets

| Home # | Price | Sq. Ft. | Days on Market | Distance |
|---|---|---|---|---|
| 1 | 200 | 2000 | 5 | 2.5 |
| 2 | 225 | 2100 | 10 | 12 |
| 3 | 215 | 2200 | 30 | 20 |
| 4 | 210 | 2100 | 7 | 15 |
| 5 | 207 | 2005 | 10 | 1.2 |
| 6 | 205 | 2000 | 60 | 36 |
| 7 | 300 | 3000 | 75 | 24 |
| 8 | 250 | 2500 | 12 | 5.1 |
| 9 | 290 | 2800 | 10 | 6 |
| 10 | 295 | 2750 | 9 | 10 |
| 11 | 275 | 2500 | 25 | 9 |
| 12 | 215 | 2100 | 12 | 3 |
| 13 | 215 | 2300 | 30 | 3.5 |
| 14 | 255 | 2500 | 45 | 5 |
| 15 | 270 | 2700 | 31 | 7 |
| 16 | 260 | 2500 | 36 | 12 |
| 17 | 250 | 2200 | 19 | 15 |
| 18 | 200 | 2000 | 1 | 10.5 |
| 19 | 295 | 2700 | 3 | 17 |
| 20 | 275 | 2600 | 15 | 17 |

| Home # | Price | Sq. Ft. | Days on Market | Distance |
|---|---|---|---|---|
| 2 | 225 | 2100 | 10 | 12 |
| 3 | 215 | 2200 | 30 | 20 |
| 4 | 210 | 2100 | 7 | 15 |
| 5 | 207 | 2005 | 10 | 1.2 |
| 8 | 250 | 2500 | 12 | 5.1 |
| 12 | 215 | 2100 | 12 | 3 |
| 13 | 215 | 2300 | 30 | 3.5 |
| 14 | 255 | 2500 | 45 | 5 |
| 16 | 260 | 2500 | 36 | 12 |
| 17 | 250 | 2200 | 19 | 15 |

| Home # | Price | Sq. Ft. | Days on Market | Distance |
|---|---|---|---|---|
| 3 | 215 | 2200 | 30 | 20 |
| 8 | 250 | 2500 | 12 | 5.1 |
| 13 | 215 | 2300 | 30 | 3.5 |
| 17 | 250 | 2200 | 19 | 15 |

| Patient # | Age | Date of Diagnosis | Dosage | BP | Weight |
|---|---|---|---|---|---|
| 1 | 5 | 1/1/05 | 12 mg | 118/60 | 30 |
| 2 | 7 | 1/1/04 | 20 mg | 120/62 | 40 |
| 3 | 31 | 3/1/05 | 30 mg | 140/75 | 160 |
| 4 | 65 | 5/2/95 | 30 mg | 135/70 | 150 |
| 5 | 57 | 6/5/00 | 25 mg | 135/75 | 160 |
| 6 | 25 | 7/30/95 | 50 mg | 150/76 | 175 |
| 7 | 35 | 5/4/00 | 45 mg | 130/70 | 163 |
| 8 | 43 | 10/10/99 | 50 mg | 120/65 | 190 |
| 9 | 26 | 12/1/01 | 50 mg | 130/60 | 180 |
| 10 | 24 | 12/30/03 | 50 mg | 131/60 | 155 |
| 11 | 12 | 10/5/05 | 25 mg | 110/55 | 75 |
| 12 | 73 | 9/20/03 | 25 mg | 133/60 | 130 |
| 13 | 44 | 10/5/00 | 50 mg | 150/80 | 150 |
| 14 | 32 | 4/24/05 | 50 mg | 155/85 | 183 |
| 15 | 35 | 2/23/03 | 50 mg | 120/60 | 175 |
| 16 | 55 | 6/4/04 | 40 mg | 123/73 | 210 |
| 17 | 54 | 10/30/05 | 35 mg | 175/80 | 191 |
| 18 | 29 | 12/1/04 | 50 mg | 200/100 | 250 |
| 19 | 31 | 12/25/02 | 50 mg | 180/90 | 175 |
| 20 | 90 | 11/8/05 | 15 mg | 123/75 | 150 |

| Patient # | Age | Date of Diagnosis | Dosage | BP | Weight |
|---|---|---|---|---|---|
| 3 | 31 | 3/1/05 | 30 mg | 140/75 | 160 |
| 6 | 25 | 7/30/95 | 50 mg | 150/76 | 175 |
| 7 | 35 | 5/4/00 | 45 mg | 130/70 | 163 |
| 8 | 43 | 10/10/99 | 50 mg | 120/65 | 190 |
| 9 | 26 | 12/1/01 | 50 mg | 130/60 | 180 |
| 10 | 24 | 12/30/03 | 50 mg | 131/60 | 155 |
| 14 | 32 | 4/24/05 | 50 mg | 155/85 | 183 |
| 15 | 35 | 2/23/03 | 50 mg | 120/60 | 175 |
| 18 | 29 | 12/1/04 | 50 mg | 200/100 | 250 |
| 19 | 31 | 12/25/02 | 50 mg | 180/90 | 175 |

| Patient # | Age | Date of Diagnosis | Dosage | BP | Weight |
|---|---|---|---|---|---|
| 3 | 31 | 3/1/05 | 30 mg | 140/75 | 160 |
| 6 | 25 | 7/30/95 | 50 mg | 150/76 | 175 |
| 7 | 35 | 5/4/00 | 45 mg | 130/70 | 163 |
| 15 | 35 | 2/23/03 | 50 mg | 120/60 | 175 |
FIG. 20
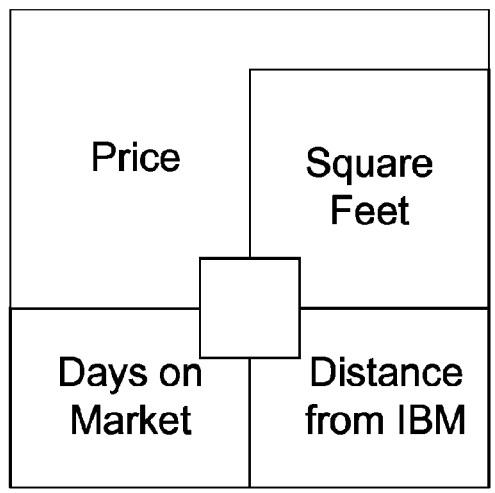
FIG. 21
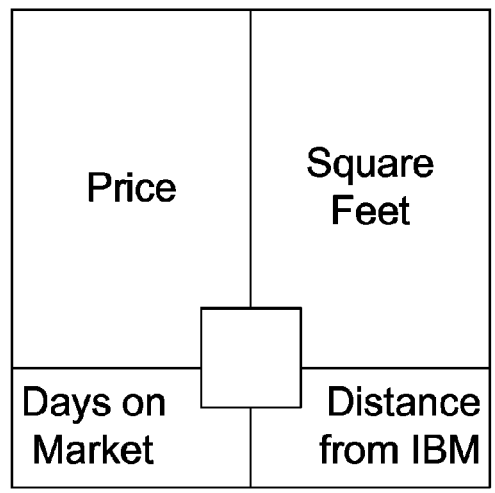
FIG. 22
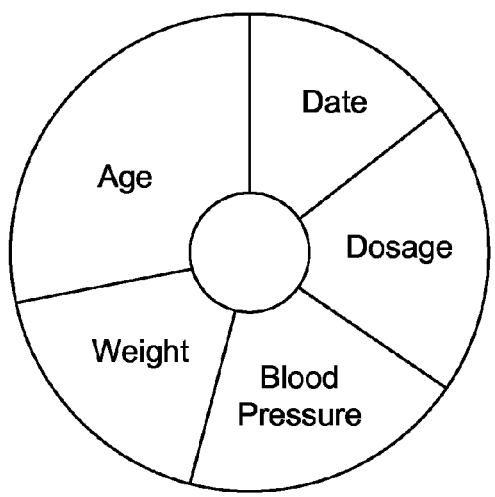
FIG. 23
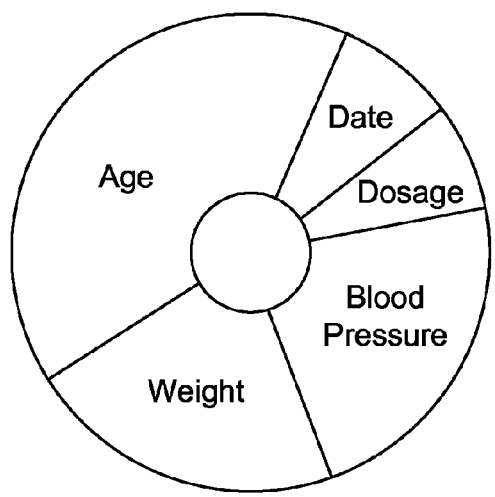
FIG. 24

MOVEMENT-BASED DYNAMIC FILTERING OF SEARCH RESULTS IN A GRAPHICAL USER INTERFACE

CROSS-REFERENCE TO PARENT APPLICATION

This patent application is a continuation of "Apparatus and Method for Movement-Based Dynamic Filtering of Search Results in a Graphical User Interface," U.S. Ser. No. 11/297,304 filed on Dec. 8, 2005, which is incorporated herein by reference.

BACKGROUND OF THE INVENTION

1. Technical Field

This invention generally relates to computer systems, and more specifically relates to filtering of search results.

2. Background Art

Search engines are commonly used to find information on the Internet. One problem that exists is the relatively large number of hits a search engine may retrieve. As a result, a user of a search engine typically sifts through the results by manually viewing the many pages of results page-by-page to locate the most relevant information in the search results. While the search engines return search results in a ranked order, from highest perceived relevance to lowest perceived relevance, the ranking methods are somewhat crude, and are based only on the search terms that were used.

One problem with the way search engines operate is they provide no user control during the search. They are typically implemented as a black box, meaning that the user puts in keywords to search, and the search engine returns the search results, which often can be lists of hundreds or thousands of hits. Another problem with known search engines is an unintuitive user interface that uses buttons, text boxes, and Boolean logic to construct complicated search syntax, which can be difficult to understand. In addition, known search engines provide no feedback to the user regarding how some change in the search terms might affect the output before the search is performed. Known search engines often provide too many results without any good way of filtering the search results. Without a way to easily filter search results under user control, the user will be stuck with manually reviewing each page of results to determine the relevance of each hit on each page.

DISCLOSURE OF INVENTION

According to the preferred embodiments, a movement-based filtering mechanism in a graphical user interface allows a user to filter search results by simply moving a pointer, such as a mouse. One or more attributes are selected for display to the user in a graphical representation that may show a visual weighting of the attributes found in the search results. By selecting the pointer (such as clicking on a mouse button), the user may dynamically filter the search results according to the attribute(s) under the pointer. Weighting of multiple attributes may be performed according to the time the pointer spends in each attribute area in the display, or according to a path length of the pointer in each attribute area in the display. In addition, the speed of the dynamic filtering may be directly controlled according to the speed of the movement of the pointer. A timeline may also be displayed that allows the user to go back to any suitable point in time in the filtering process. The result is a graphical user interface that allows the user to dynamically filter search results according to the movement of the pointer, and that allows the user to go back or undo filtering using the timeline.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 20 is a sample display of the further filtered search results according to the pointer movement shown in FIG. 19;

FIG. 21 is a sample display of the four quadrant graphical representation showing dynamic re-sizing of the regions after the filtering that occurs due to the pointer movement in FIG. 11;

FIG. 22 is a sample display of the four quadrant graphical representation showing dynamic re-sizing of the regions after the filtering that occurs due to the pointer movement in FIG. 13;

FIG. 23 is a sample display of the pie-shaped graphical representation showing dynamic re-sizing of the slices after the filtering that occurs due to the pointer movement in FIG. 17; and FIG. 24 is a sample display of the pie-shaped graphical representation showing dynamic re-sizing of the slices after the filtering that occurs due to the pointer movement in FIG. 19.

BEST MODE FOR CARRYING OUT THE INVENTION

The preferred embodiments provide a movement-based filtering mechanism that dynamically filters search results according to the action of a pointer on a graphical representation of attributes in a graphical user interface. Multiple attributes may be used for simultaneous filtering according to the path of the pointer over the graphical representation of attributes. The speed of filtering is preferably controlled according to the speed of moving the pointer. A timeline is also provided that allows the user to go back in time to an earlier result. The user may thus perform dynamic filtering of search results according to movement of a pointer on a graphical representation of attributes in the search results, thereby providing a very simple and intuitive user interface to filter a large number of search results into a smaller, more relevant and more manageable number of search results.

Figure 1:
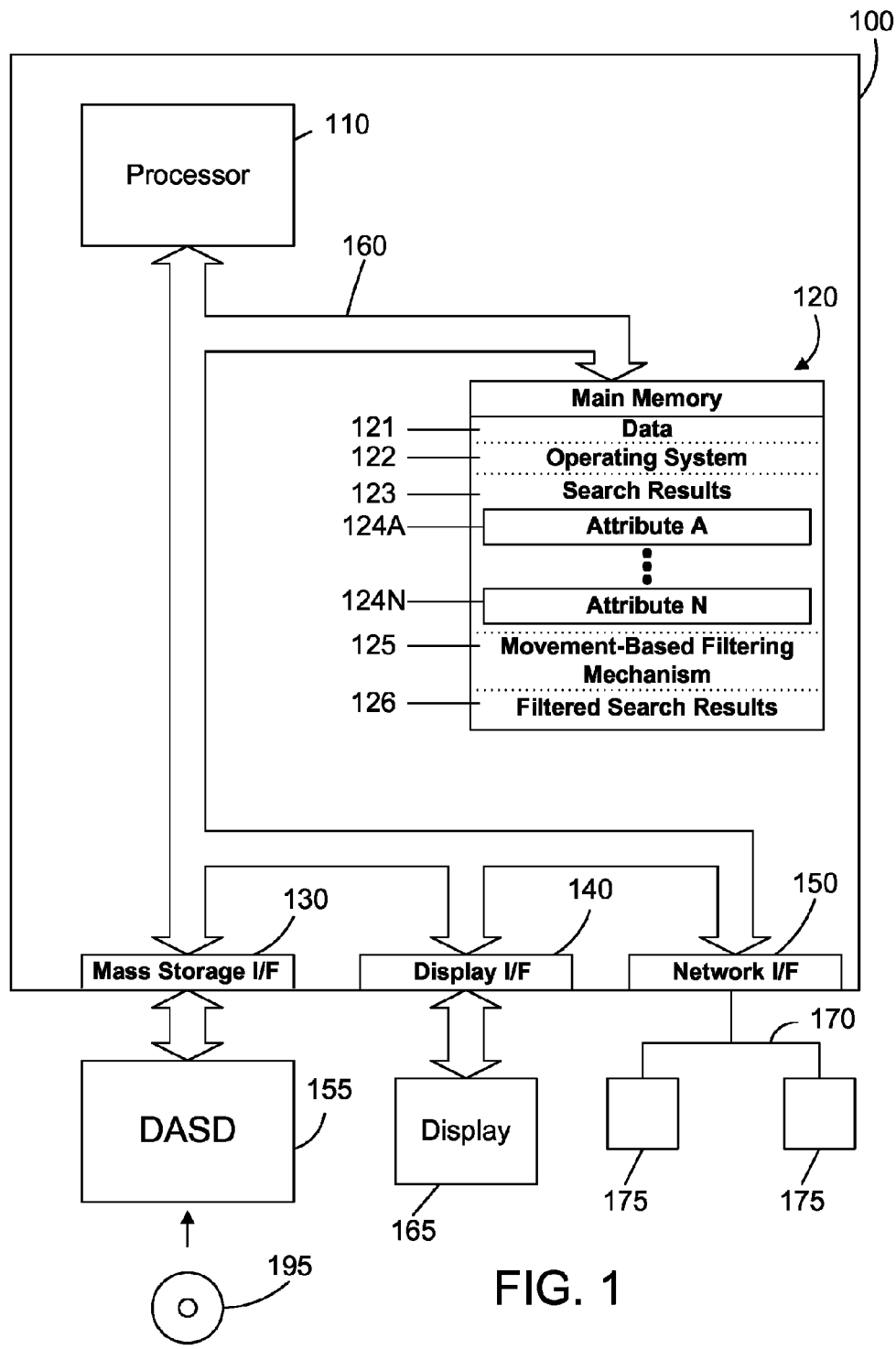
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, search results 123, a movement-based filtering mechanism 125, and filtered search results 126. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Search results 123 represent search results from using a search engine on the Internet, a database query engine, or an unstructured data query. Search results 123 preferably include a plurality of attributes, shown in FIG. 1 as 124A, . . . , 124N. The term "attribute" herein is used in a broad sense to mean any feature of the search results, and preferably means fields within the search results that may be used as keys for filtering the search results.

The movement-based filtering mechanism 125 displays two or more attributes (e.g., 124A, . . . , 124N) of a selected set of search results (e.g., 123) in a graphical user interface. The user may then use a pointer, such as a mouse, stylus or button, to dynamically filter the search results 123 according to movement of the pointer. The filtering is dynamic by occurring iteratively as the user moves the pointer instead of waiting until pointer movement is finished. When the user performs dynamic filtering by moving the pointer over the displayed attributes, the result is filtered search results 126, which are a subset of the search results 123 by virtue of the filtering process that removed entries from the search results 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, search results 123, movement-based filtering mechanism 125, and filtered search results 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
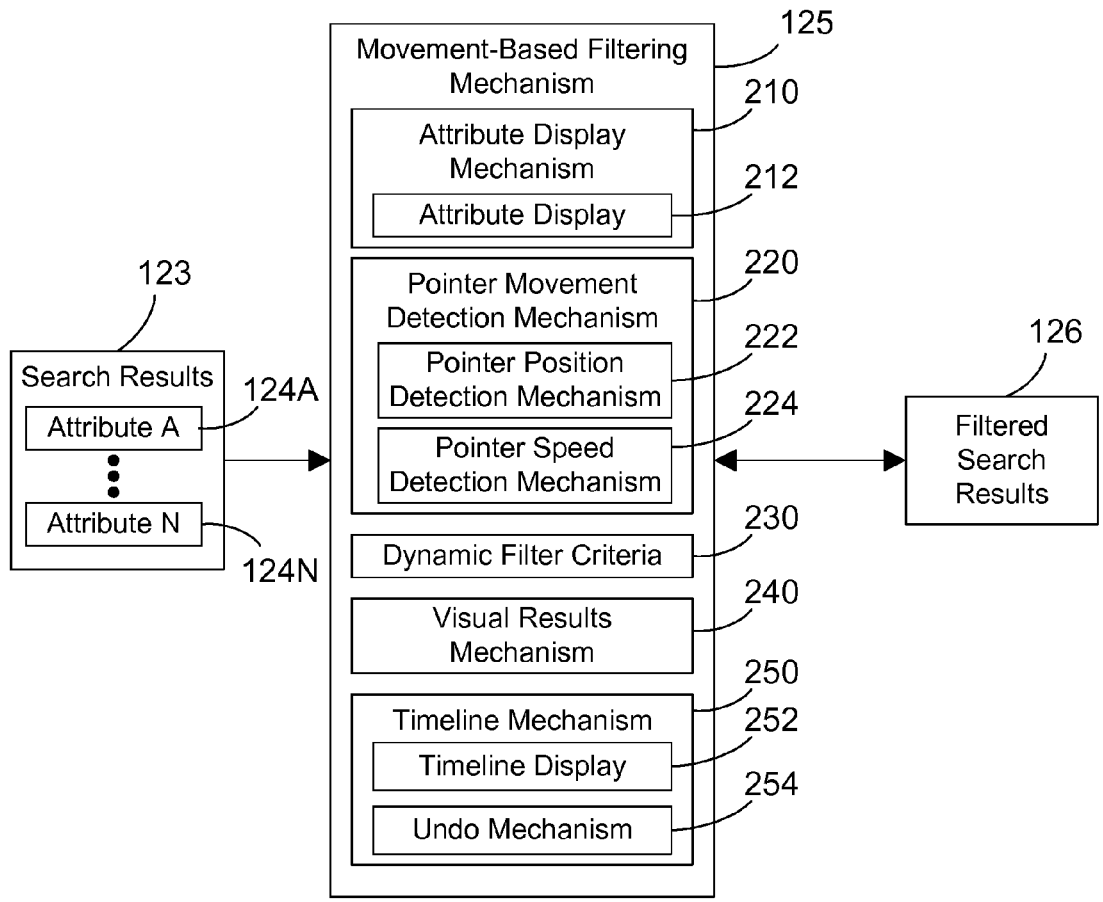
FIG. 2 is a block diagram showing details in accordance with the preferred embodiments for the movement-based filtering mechanism shown in FIG. 1.

Details of the movement-based filtering mechanism 125 in FIG. 1 are shown in FIG. 2. Movement-based filtering mechanism 125 preferably includes an attribute display mechanism 210, a pointer movement detection mechanism 220, dynamic filter criteria 230, a visual results mechanism 240, and a timeline mechanism 250. The attribute display mechanism 210 provides an attribute display 212 on a graphical user interface. The attribute display 212 is a graphical representation of two or more attributes in the search results 123, where the graphical representation includes different portions that correspond to the different attributes to be displayed. The user initiates dynamic filtering using the movement-based filtering mechanism 125 by placing a pointer on the graphical representation and selecting the pointer.

The pointer movement and detection mechanism 220 includes a pointer position detection mechanism 222 and a pointer speed detection mechanism 224. The pointer position detection mechanism 222 determines a current position of the pointer, and also determines a path the pointer has traveled since the pointer has been selected. Note that the term "selecting a pointer" simply means the pointer is enabled with a desired function, while "deselecting a pointer" means the desired function is disabled. One simple example of selecting a pointer is clicking on a mouse button, while deselecting the pointer is releasing the mouse button. Note that the pointer position may already be determined by the operating system that includes a pointer interface, so most or all of the function of the pointer position detection mechanism 222 may be built into the operating system.

The pointer speed detection mechanism 224 detects a speed of pointer movement. The speed of pointer movement is used to determine a relative speed of filtering. Thus, if the pointer is selected but not moved, a default, relatively slow speed of filtering is used. As the pointer is moved, the speed of the filtering may increase, with faster pointer movement resulting in faster filtering. Note that the pointer speed may also be determined by the operating system, so most or all of the function of the pointer speed detection mechanism 224 may be built into the operating system.

The pointer movement detection mechanism 220 generates from the pointer position, path and speed dynamic filter criteria 230. The dynamic filter criteria 230 depend upon the path of the pointer, and whether the pointer path extends to multiple regions in the graphical representation that correspond to multiple attributes. The dynamic filter criteria 230 is applied to the search results 123 by the movement-based filter mechanism 125, which generates therefrom filtered search results 126. Note that the filtered search results 126 may be operated on by the movement-based filtering mechanism 125 for several different stages of filtering. Note also that the filtered search results 126 preferably include multiple attributes that are not shown in the figures herein.

The visual results mechanism 240 provides a visual indication of the affects of the filtering in the graphical representation of attributes displayed to the user. For example, if the graphical representation of attributes displayed to the user is a pie chart, the size of each slice will be determined by how much time the pointer spent over the slice during the filtering process. As the dynamic filtering is performed based on the pointer movements by the user, the visual results mechanism 240 can dynamically re-size the pie slices in the graphical representation to represent the results of the dynamic filtering. In addition, the visual results mechanism 240 can also display a number that shows the size of the search results, with the number dynamically changing (getting smaller) as the dynamic filtering occurs. For example, the number 620 in FIG. 6, while representing a reference designator for the neutral area in FIG. 6 in the discussion above, this number 620 in FIG. 6 could optionally represent a counter of search results. This allows the user to easily determine the effect on the number of search results as the dynamic filtering proceeds, and to stop when the size of the search results is a desired number.

The timeline mechanism 250 provides a timeline display 252 and an undo mechanism 254. The timeline display 252 is a graphical line with a cursor to mark the current location in the timeline. The undo mechanism 254 includes one or more markers on the timeline display 252 that the user may select to undo the filtering that occurred between the cursor and the marker, thereby providing the user interactive control of the filtering process. A user can thus go back to an earlier time in the filtering process. If the filtering is performed in stages, markers may be placed on the timeline at each of the stages so the user can easily return to an earlier stage by selecting a marker on the timeline.

Figure 3:
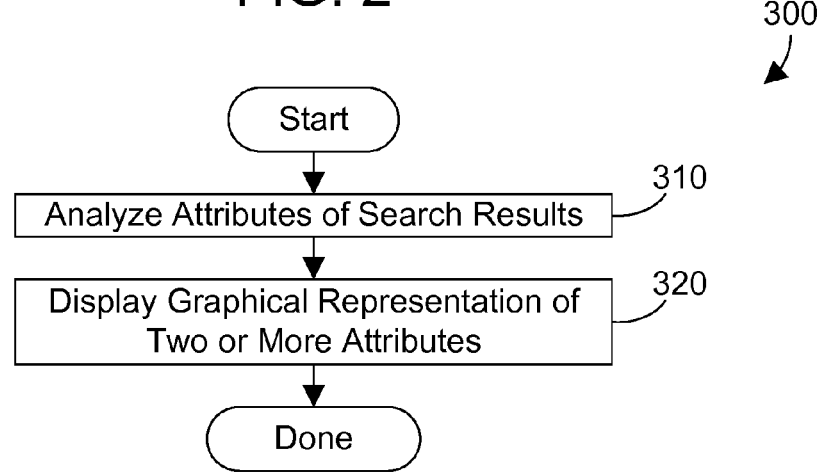
FIG. 3 is a flow diagram of a method for displaying graphical representation of multiple attributes in search results in accordance with the preferred embodiments.

Referring to FIG. 3, a method 300 in accordance with the preferred embodiments first analyzes attributes of the search results (step 310), then displays a graphical representation of two or more of the attributes (step 320). The attributes may be any term or feature of the search results, and preferably includes terms or features that may be used as keys in filtering the search results. Method 300 may include many variations, two of which are shown as methods 400 and 500 in FIGS. 4 and 5, respectively.

Figure 4:
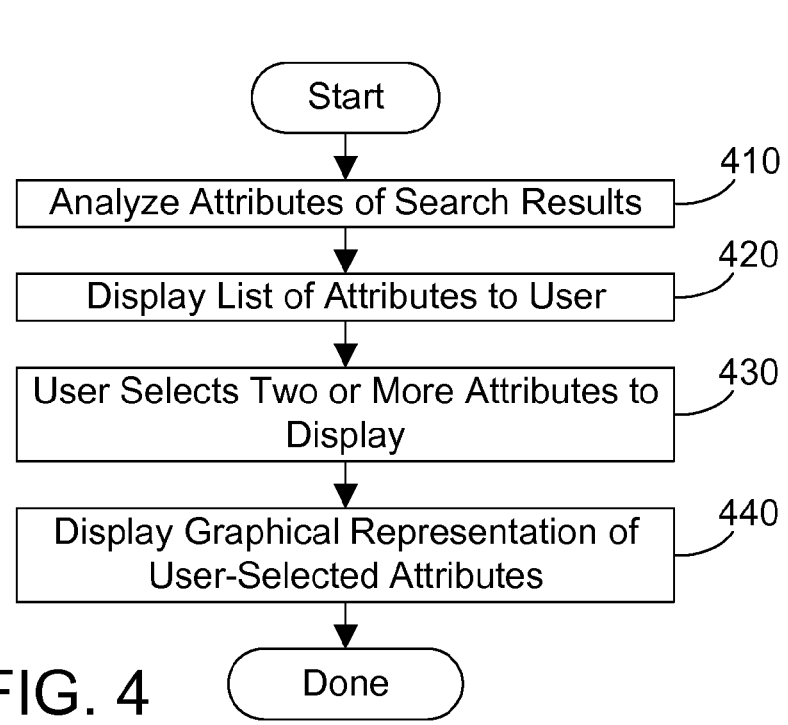
FIG. 4 is a flow diagram of a method that shows a first specific implementation for method 300 in FIG. 3 in accordance with the preferred embodiments.

Referring to FIG. 4, a method 400 is an example of a first specific implementation of method 300 in FIG. 3. Method 400 begins by analyzing the attributes in the search results (step 410). A list of these attributes is displayed to a user (step 420). The list displayed to the user may include all of the detected attributes, or may include the top N attributes, where N is any suitable positive integer up to the total number of detected attributes. For example, step 420 could display only the top four detected attributes. Once the list is displayed to a user, the user may select two or more attributes to display (step 430). A graphical representation of the user-selected attributes is then displayed (step 440). In method 400, the user has complete control over the selection of attributes for the graphical representation.

Figure 5:
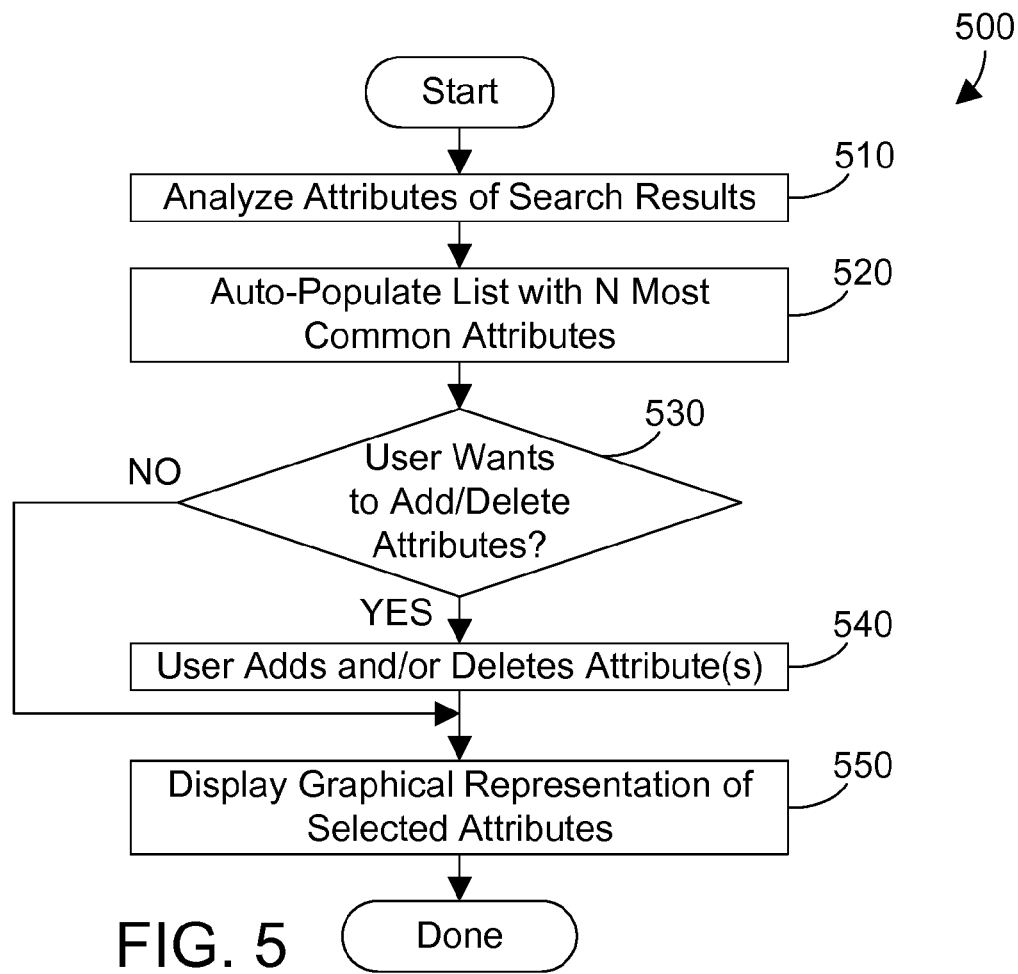
FIG. 5 is a flow diagram of a method that shows a second specific implementation for method 300 in FIG. 3 in accordance with the preferred embodiments.

Referring to FIG. 5, a method 500 is an example of a second specific implementation of method 300 in FIG. 3. Method 500 begins by analyzing the attributes in the search results (step 510). A list of attributes may then be automatically populated with the N most common attributes (step 520). If the user does not want to add or delete attributes from the list (step 530=NO), the graphical representation of the selected attributes is displayed (step 550). If the user wants to add or delete attributes from the list (step 530=YES), the user adds and/or deletes attributes from the list (step 540), then the graphical representation of the selected attributes is displayed (step 550). One skilled in the art will recognize from methods 400 and 500 that many other variations are within the scope of method 300 in FIG. 3, and the preferred embodiments expressly extend to all variations, whether currently known or developed in the future.

Figure 6:
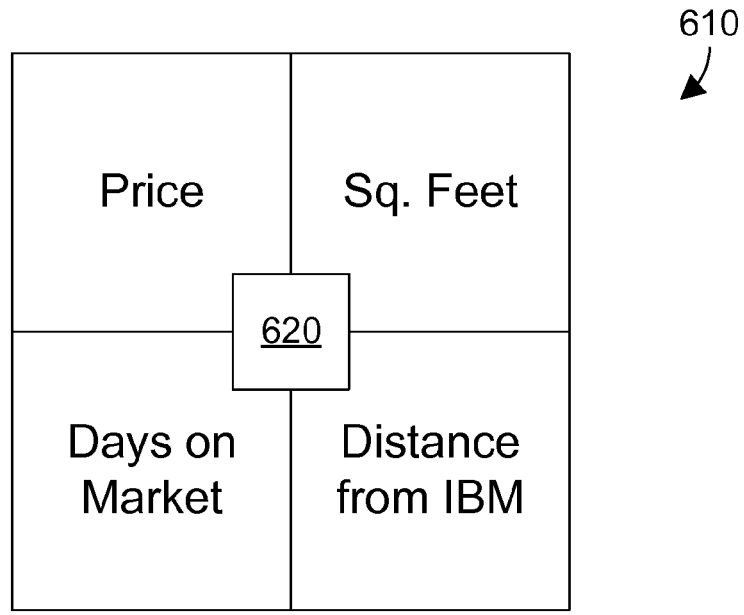
FIG. 6 is an example graphical representation of four attributes found in search results for a real estate search.

One example of a graphical representation 610 that could be displayed in step 320 of FIG. 3, step 440 of FIG. 4, or step 550 of FIG. 5 is shown in FIG. 6. We assume the search results relate to real estate (homes), and have selected attributes of Price, Square Feet, Days on Market, and Distance from IBM (meaning from a particular IBM work location of interest). These four selected attributes may be displayed in a four quadrant form, as shown in FIG. 6. Note that the graphical representation 610 preferably includes a neutral region 620 that allows the pointer to pass from one quadrant to another without having to pass through a neighboring quadrant first. Thus, if the user desires to filter search results based on Price and Distance from IBM, the user may move the pointer between the Price quadrant, through the neutral region 620, to the Distance from IBM quadrant without passing through either of the two other quadrants. Note that the neutral region 620 could optionally include the display of a number that represents the number of search results, with the number dynamically getting smaller as the number of search results decreases due to the dynamic filtering.

Now that a graphical representation has been displayed to the user, the user may perform different functions with the pointer to dynamically filter the search results based on selection, position, movement, and speed of the pointer. In the most preferred implementation of the preferred embodiments, the filtering begins when the pointer is selected (step 710). As discussed above, a pointer is selected by the user performing some operation on the pointer, such as clicking on a mouse button. The search results are then dynamically filtered based on the one or more attributes under the pointer (step 720), with the speed of dynamic filtering being determined by the speed of the pointer movement (step 730). An example will help understand the detailed function of steps 720 and 730. Let's assume a user performs a pointer select in the Price quadrant of the graphical representation 610. If the pointer does not move, the search results will slowly be filtered based on Price alone. If the pointer is moved, say in a circular path, within the Price quadrant, the speed of the filtering will increase, and will depend upon the speed of the pointer travel. Thus, fast movement of the pointer will result in faster filtering based solely on price. Note that multiple attributes may be used to filter search results. For example, in the graphical representation in FIG. 6, the user may select multiple attributes for filtering by dragging a selected pointer across multiple quadrants.

Figure 8:
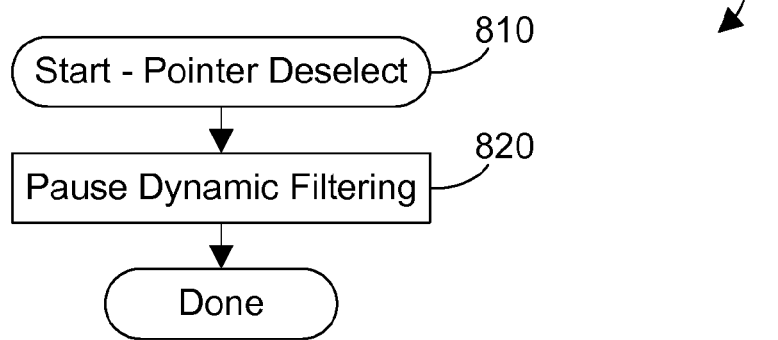
FIG. 8 is a flow diagram of a method in accordance with the preferred embodiments for pausing dynamic filtering when the pointer is deselected.

Referring to FIG. 8, a method 800 in accordance with the preferred embodiments shows how dynamic filtering may be paused in the most preferred implementation of the preferred embodiments. Method 800 begins by deselecting the pointer (e.g., release mouse button). With the pointer deselected, dynamic filtering is paused (step 820). The user can thus easily control the filtering process by performing an action with the pointer to cause dynamic filtering, then by deselecting the pointer, then starting a subsequent filtering function, etc.

Figures 9, 10:
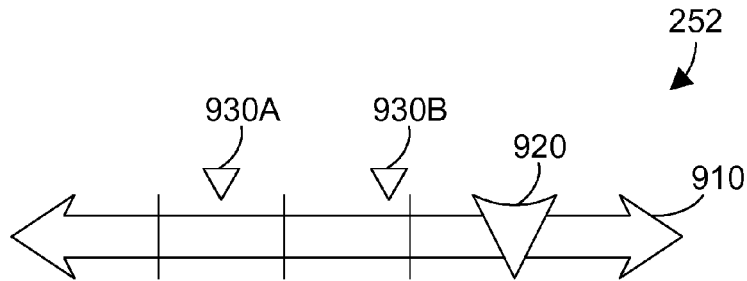
FIG. 9 is a sample display of a timeline in accordance with the preferred embodiments.
FIG. 10 is a table showing search results of a sample search for homes.

Referring to FIG. 9, a timeline display 252 includes a line 910 that includes a cursor 920 to graphically represent a relative time position since filtering of the search results began. Note that timeline display 252 may include one or more markers, such as markers 930A and 930B in FIG. 9, that denote points in time that the user may go back to if the user becomes dissatisfied with the filtering. Thus, the user could go back to the point in time represented by time marker 930B by either selecting time marker 930B, or by selecting the cursor 920 and sliding the cursor to the time marker 930B. Similarly, the user could go back to the point in time represented by time marker 930A by either selecting time marker 930A, or by selecting the cursor 920 and sliding the cursor to the time marker 930A. The timeline display 252 provides an effective and easy tool for a user to undo filtering results and go back to an earlier time in the filtering process.

Two examples are now presented to illustrate many of the concepts discussed above. Table 1000 in FIG. 10 shows search results that could result, for example, from a search using an Internet search engine. In the alternative, Table 1000 could be the result set of a database query. The preferred embodiments expressly extend to any and all types of search results. Table 1000 includes five columns. The Home # column is an integer that is used to uniquely identify a record in the table 1000. The Price column includes the price of the home. The square feet (Sq. Ft.) column indicates the square footage of the home. The Days on Market column indicates the number of days the home has been on the real estate market. And the Distance column indicates the distance in miles from the home to a desired workplace, such as a particular IBM location.

Figure 7:
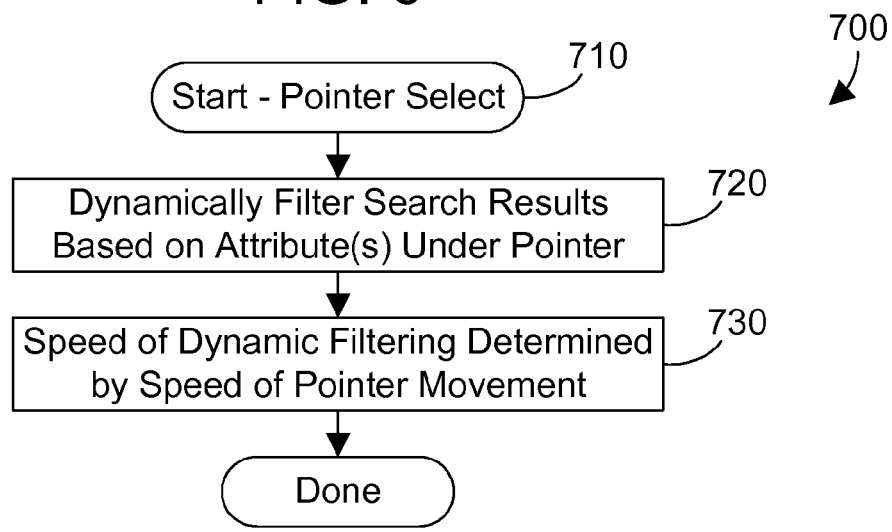
FIG. 7 is a flow diagram of a method in accordance with the preferred embodiments for dynamically filtering search results based on movement of a pointer when the pointer is selected.
Figures 11, 12:
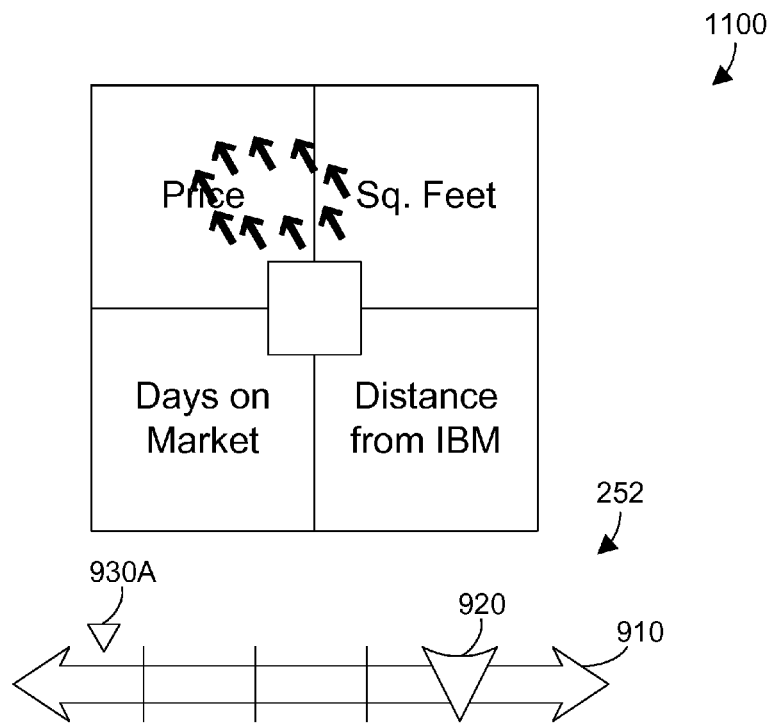
FIG. 11 is a sample graphical representation of attributes for the sample search for homes that results in the search results shown in the table of FIG. 10, with sample pointer movement.
FIG. 12 is a table of the filtered search results according to the pointer movement shown in FIG. 11.

Applying method 300 of FIG. 3, the attributes of the search results include price, square feet, days on market, and distance from IBM. We assume all of these attributes are selected, and are displayed in a graphical representation 1100, such as that shown in FIG. 11. Graphical representation 1100 is one suitable example of the attribute display 212 in FIG. 2. Note that the graphical representation 1100 preferably includes the timeline display 252 that allows the user to go back in time to an earlier stage in the dynamic filtering process. In the alternative, the timeline display 252 could be selectively enabled or disabled for display to the user. Let's now assume the user selects the pointer and moves the pointer in an elliptical path between the Price and Sq. Feet quadrants, as shown in FIG. 11. The selection of the pointer starts method 700 in FIG. 7 (step 710). The dynamic filter criteria 230 in FIG. 2 may be determined from the attributes under the pointer as the pointer moves. For this example, we assume the relative weighting of attributes is based on the time the pointer spends on each attribute region in the graphical representation. For the elliptical path in FIG. 11, we assume the pointer is over the Price quadrant approximately 70% of the time, and over the Sq. Feet quadrant approximately 30% of the time. This means the filtering will be performed with a 70% weight on the price attribute, and a 30% weight on the square feet attribute. We assume the seven highest prices were dropped from the original search results, along with three houses that had the lowest square footage, resulting in the filtered search results shown in FIG. 12. Note that 10 records total were dropped, with 70% of these records dropped due to their price, and 30% dropped due to their square footage, as indicated by approximately 70% of the area of the ellipse residing in the Price quadrant and approximately 30% of the area of the ellipse residing in the Sq. Feet quadrant.

Figures 13, 14:
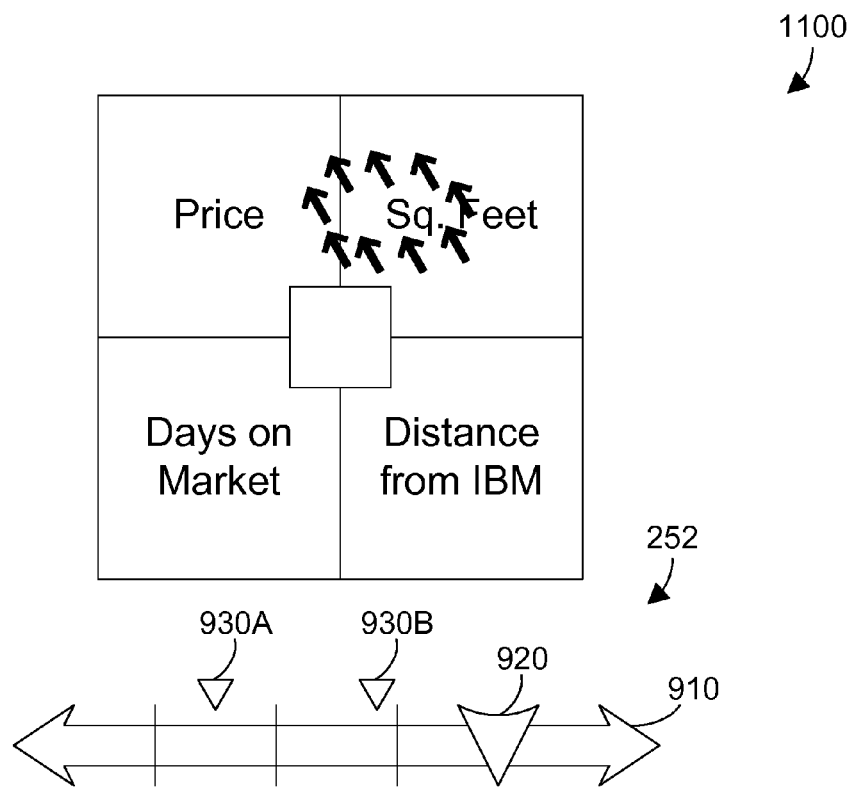
FIG. 13 is a sample graphical representation of the attributes with a different pointer movement to further filter the search results.
FIG. 14 is a sample display of the further filtered search results according to the pointer movement shown in FIG. 13.

We assume that marker 930A is placed in the timeline display 252 in FIG. 11 to denote the search results before the filtering that results in the filtered search results in FIG. 12. Note that markers may be placed in the timeline display in any suitable manner. For example, a user can manually place markers on the timeline display. In the alternative, markers may be automatically placed on the timeline display based on a set time interval (e.g., every 20 seconds) or when a change in pointer pattern is detected. Once the filtering has been performed, a second marker 930B may be added to the timeline display 252 to indicate a point in time to which the user may revert if subsequent filtering proves to be unsatisfactory, as shown in FIG. 13. We assume that the user next puts a greater emphasis on square footage and less of an emphasis on price by moving the pointer in an elliptical path as shown in FIG. 13, which we assume causes the pointer to spend approximately 30% of its time in the Price quadrant and approximately 70% of its time in the Sq. Feet quadrant. Once the preliminary filtering was performed emphasizing price, the user may now perform additional filtering emphasizing square footage. As a result, the filtered search results in FIG. 12 are further filtered according to the new dynamic filter criteria derived from the elliptical path of the pointer shown in FIG. 13. We assume for this example that the four smallest square footage homes and the two highest priced homes are dropped, resulting in the filtered search results shown in FIG. 14. This simple example shows how the user has complete control over the filtering process according to the movement of the pointer on the graphical representation of the selected search result attributes. If the user were not satisfied with the filtered search results shown in FIG. 14, the user could select the marker 930B in the timeline display 252 to revert back to the filtered search results in FIG. 12, or could select the marker 930A in the timeline display 252 to revert back to the original search results shown in FIG. 10.

Figure 15:
FIG. 15 is a table showing search results of a sample search of medical records.
Figure 16:
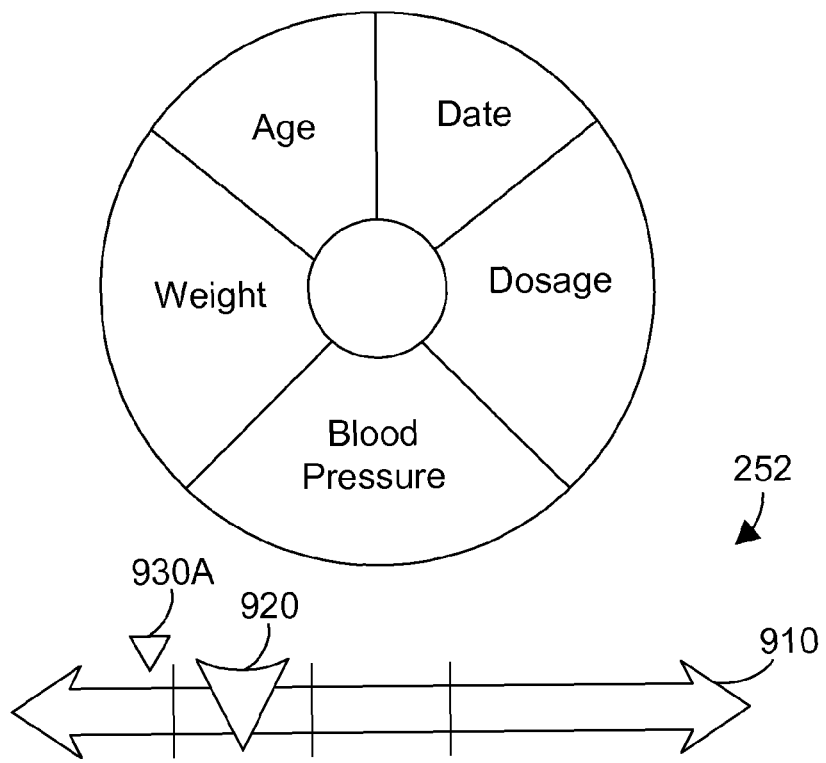
FIG. 16 is a sample graphical representation of attributes for the sample search of medical records that results in the search results shown in the table of FIG. 15
Figure 17:
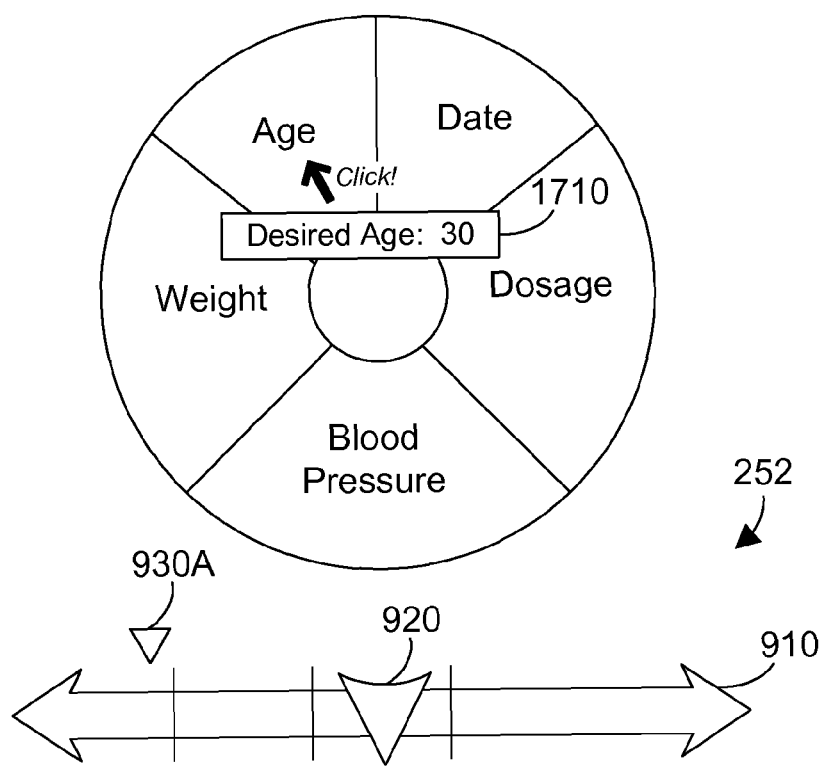
FIG. 17 is the sample graphical representation of attributes for the sample search of medical records, with sample pointer position and selection.
Figures 18, 19:
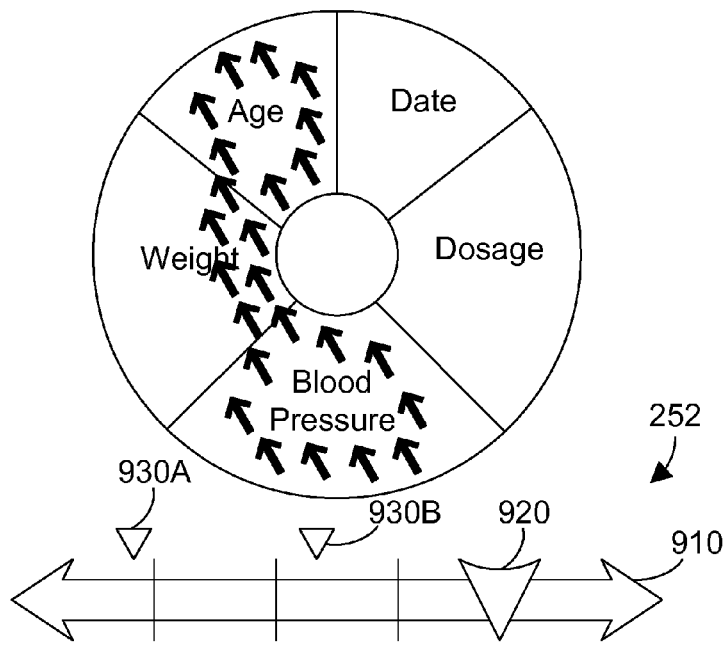
FIG. 18 is a table of the filtered search results according to the pointer position and selection shown in FIG. 17.
FIG. 19 is a sample graphical representation of the attributes with a different pointer movement to further filter the search results.

Another example is now presented to illustrate another form of graphical representation. Referring to FIG. 15, we assume a table 1500 represents search results, and includes records from twenty patients that have a particular medical condition. The attributes in the search results include Age, Date of Diagnosis, Dosage, blood pressure (BP), and Weight, as shown by the columns in FIG. 15. We assume all of these columns are selected for display in the graphical representation, as shown in FIG. 16. A user may now filter the search results in table 1500 according to pointer selection, position, movement and speed on the graphical representation in FIG. 16. For example, we assume the user desires to filter according to the patient's age. The user may select the pointer on the Age region, as indicated by the Click! in FIG. 17. As a result, a box 1710 is displayed that prompts the user to enter a desired age. The user enters 30 as the desired age, as shown in FIG. 17. The user may then select the pointer on the Age region, and the search results in FIG. 15 are dynamically filtered according to the age attribute with a value of 30. We assume the 10 records that have an age the farthest away from 30 are dropped, resulting in the filtered search results shown in FIG. 18. We now assume the user changes filtering criteria by moving the selected pointer through a path as shown in FIG. 19. This allows all three attributes Age, Weight and Blood Pressure to be emphasized during the dynamic filtering process according to the time spent by the pointer in each pie slice. Blood Pressure is the highest priority because the pointer spent the most time within the Blood Pressure slice boundaries. We assume three entries are dropped from the list based on blood pressure. The second priority is Age, and we assume two entries are dropped from the list based on age. The last is weight, and we assume one entry is dropped from the list based on weight. The resulting filtered search results are shown in FIG. 20. If the user were not satisfied with the filtered search results shown in FIG. 20, the user could select the marker 930B in the timeline display 252 of FIG. 19 to revert back to the filtered search results in FIG. 18, or could select the marker 930A in the timeline display 252 of FIG. 19 to revert back to the original search results shown in FIG. 15.

What is not easily represented in the static drawings herein is that filtering speed can be a function of the speed of the pointer movement. Thus, in FIG. 11, the records will be filtered from the search results faster if the speed of the pointer movement is fast, and will be slower if the speed of the pointer movement is slow. Note that the user could re-trace the ellipse multiple times at different speeds, thereby dynamically changing the speed of the filtering process according to the speed of the pointer movement.

Note that the visual results mechanism 240 in FIG. 2 may be optionally configured to dynamically re-size the graphical representation as the filter proceeds. Thus, the quadrants in FIG. 11 could dynamically change proportions as records are dropped (filtered) from the search results. Thus, after the filtering that occurs due to the pointer movement shown in FIG. 11, the size of the four quadrants in the graphical representation could be re-sized to reflect the time the pointer spent over each quadrant (and hence, the amount of filtering performed based on that attribute), as shown in FIG. 21. Assuming the pointer path shown in FIG. 13 is then used between the Price and Square Feet quadrants shown in FIG. 21, the resulting re-sized graphical representation is shown in FIG. 22. Likewise, the size of the pie slices in FIGS. 17 and 19 could dynamically change as records are dropped from the search results, as shown in FIG. 23, which represents the graphical representation after the filtering in FIG. 17, and FIG. 24, which represents the graphical representation after the filtering in FIG. 19.

The examples provided herein are greatly simplified for the purpose of illustrating the general concepts of the preferred embodiments. One skilled in the art will realize that search results may include a large number of attributes, and a large number of entries. The utility of the movement-based filter mechanism disclosed herein increases as the number of attributes in search results and as the number of entries in the search results increase. The preferred embodiments expressly extend to any suitable weighting of attributes in the dynamic search criteria based on pointer selection, position, movement, and speed.

As the example in FIG. 17 shows, some attributes require user input to indicate a desired value or range of values, whether the attribute should be in ascending or descending order, or whether the attribute should be maximized or minimized. Once the list of attributes that will appear in the graphical representation is determined, a user could be presented with a setup screen that allows the user to specify values, order, ranges, max/min, etc. for each of the attributes. Thus, a setup screen for the four quadrant display 1100 in FIG. 11 might allow the user to specify to minimize price, maximize square feet, and minimize distance from IBM.

The preferred embodiments do not replace search engines or database engines, but instead provide a tool that allows a user to interactively control filtering of search results returned by search engines or database engines according to movements of a pointer in a graphical user interface. The graphical, movement-based interface provide a very intuitive and easy-to use way to filter search results. In addition, the timeline display allows the user easily to go back in time to an earlier stage of the filtering process.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   search results residing in the memory; and
   a movement-based filtering mechanism residing in the memory and executed by the at least one processor, the movement-based filtering mechanism displaying a graphical representation of a plurality of attributes of the search results, wherein the graphical representation simultaneously displays all of the plurality of attributes before the movement-based filtering mechanism performs any filtering, and the movement-based filtering mechanism dynamically filtering the search results according to movement of a pointer by a user of the apparatus on the graphical representation when the pointer is selected to generate therefrom filtered search results, wherein the dynamic filtering is enabled when the pointer is selected and is paused when the pointer is deselected, wherein the movement-based filtering mechanism displays a counter of the number of the search results that decreases as the dynamic filtering occurs.

2. The apparatus of claim 1 wherein at least one attribute used for the filtering by the movement-based filtering mechanism depends upon movement of the pointer by the user over a portion of the graphical representation corresponding to the at least one attribute.

3. The apparatus of claim 1 wherein the movement-based filtering mechanism displays a timeline with at least one marker that allows the user to backup in time to an earlier stage of the filtering.

4. The apparatus of claim 1 wherein the movement-based filtering mechanism performs the dynamic filtering according to a weighting of the plurality of attributes that is based on time the pointer spends in a plurality of regions in the graphical representation that correspond to the plurality of attributes.

5. The apparatus of claim 4 wherein the movement-based filtering mechanism resizes a size of at least one displayed region in the graphical representation of the plurality of attributes according to the weighting of the plurality of attributes.

6. The apparatus of claim 1 wherein a speed of the dynamic filtering by the movement-based filtering mechanism depends upon a speed of the movement of the pointer by the user.

7. A computer-readable program product comprising:
   a movement-based filtering mechanism that displays a graphical representation of a plurality of attributes of search results, wherein the graphical representation simultaneously displays all of the plurality of attributes before the movement-based filtering mechanism performs any filtering, and the movement-based filtering mechanism dynamically filters the search results according to movement of a pointer by a user on the graphical representation when the pointer is selected to generate therefrom filtered search results, wherein the dynamic filtering is enabled when the pointer is selected and is paused when the pointer is deselected, wherein the movement-based filtering mechanism displays a counter of the number of the search results that decreases as the dynamic filtering occurs; and
   recordable media bearing the movement-based filtering mechanism.

8. The program product of claim 7 wherein at least one attribute used for the filtering by the movement-based filtering mechanism depends upon movement of the pointer by the user over a portion of the graphical representation corresponding to the at least one attribute.

9. The program product of claim 7 wherein the movement-based filtering mechanism displays a timeline with at least one marker that allows the user to backup in time to an earlier stage of the filtering.

10. The program product of claim 7 wherein the movement-based filtering mechanism performs the dynamic filtering according to a weighting of the plurality of attributes that is based on time the pointer spends in a plurality of regions in the graphical representation that correspond to the plurality of attributes.

11. The program product of claim 10 wherein the movement-based filtering mechanism resizes a size of at least one displayed region in the graphical representation of the plurality of attributes according to the weighting of the plurality of attributes.

12. The program product of claim 7 wherein a speed of the dynamic filtering by the movement-based filtering mechanism depends upon a speed of the movement of the pointer by the user.

13. A computer-implemented method for dynamically filtering search results, the method comprising the steps of:
   determining a plurality of attributes in the search results;
   displaying a graphical representation that simultaneously displays all of the plurality of attributes before performing any filtering;
   enabling dynamic filtering when a pointer on the graphical representation is selected;
   dynamically filtering the search results according to movement of the pointer on the graphical representation by a user when the pointer is selected to generate therefrom filtered search results;
   displaying a counter of the number of the search results that decreases as the dynamic filtering occurs; and
   pausing the dynamic filtering when the pointer is deselected.

14. The method of claim 13 wherein at least one attribute used for the filtering by the movement-based filtering mechanism depends upon movement of the pointer by the user over a portion of the graphical representation corresponding to the at least one attribute.

15. The method of claim 13 further comprising the step of displaying a timeline with at least one marker that allows the user to backup in time to an earlier stage of the filtering.

16. The method of claim 13 wherein the dynamic filtering is performed according to a weighting of the plurality of attributes that is based on time the pointer spends in a plurality of regions in the graphical representation that correspond to the plurality of attributes.

17. The method of claim 16 further comprising the step of resizing a size of at least one displayed region in the graphical representation of the plurality of attributes according to the weighting of the plurality of attributes.

18. The method of claim 13 wherein a speed of the dynamic filtering depends upon a speed of the movement of the pointer by the user.

* * * * *